United States Patent
Choi et al.

(10) Patent No.: US 8,077,783 B2
(45) Date of Patent: Dec. 13, 2011

(54) METHOD AND APPARATUS FOR DETECTING TRANSMISSION SYMBOL USING LATTICE-REDUCTION MATRIX IN MULTIPLE INPUT MULTIPLE OUTPUT (MIMO) SYSTEM

(75) Inventors: Eoi-Young Choi, Yongin-si (KR); Jeong-Taek Lee, Seoul (KR); Joon-Hyun Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 817 days.

(21) Appl. No.: 12/078,786

(22) Filed: Apr. 4, 2008

(65) Prior Publication Data
US 2009/0185631 A1    Jul. 23, 2009

(30) Foreign Application Priority Data
Jan. 21, 2008  (KR) ........................ 10-2008-0006157

(51) Int. Cl.
*H04K 1/10* (2006.01)
*H03K 9/00* (2006.01)
(52) U.S. Cl. ....................................... 375/260; 375/316
(58) Field of Classification Search .................. 375/260, 375/316, 259
See application file for complete search history.

(56) References Cited

U.S. PATENT DOCUMENTS

| | | | |
|---|---|---|---|
| 2003/0139189 A1* | 7/2003 | Alexander, Jr. ................ | 455/456 |
| 2004/0083082 A1 | 4/2004 | Onggosanusi et al. | |
| 2006/0146945 A1* | 7/2006 | Chow et al. ................... | 375/260 |
| 2008/0043864 A1* | 2/2008 | Fujii ............................. | 375/260 |
| 2008/0075183 A1* | 3/2008 | Ponnampalam et al. ..... | 375/260 |

FOREIGN PATENT DOCUMENTS

| | | |
|---|---|---|
| KR | 2003-0047178 | 6/2003 |
| KR | 10-2007-0063111 | 6/2007 |
| KR | 10-2007-0081786 | 6/2007 |
| KR | 1020070061734 A | 6/2007 |
| WO | WO 03/047118 A2 | 6/2003 |

* cited by examiner

*Primary Examiner* — David C. Payne
*Assistant Examiner* — Brian J Stevens
(74) *Attorney, Agent, or Firm* — NSIP Law

(57) ABSTRACT

Provided are a method and apparatus for detecting a transmission symbol using a lattice-reduction matrix in a Multiple Input Multiple Output (MIMO) system. The transmission symbol detection method includes: restoring an original transmission symbol from a reception signal received through the plurality of antennas; and obtaining at least one noise component included in the reception signal from a constellation changed due to applying the lattice-reduction matrix, exchanging a position of the at least one noise component under a predetermined condition which depends on a state of the restored transmission symbol, and processing the at least one noise component whose position is changed, together with the restored transmission symbol, thereby providing a soft output. Therefore, it is possible to obtain a performance gain in channel decoding.

17 Claims, 6 Drawing Sheets

METHOD AND APPARATUS FOR DETECTING TRANSMISSION SYMBOL USING LATTICE-REDUCTION MATRIX IN MULTIPLE INPUT MULTIPLE OUTPUT (MIMO) SYSTEM

CROSS REFERENCE TO RELATED APPLICATIONS

This application claims priority from Korean Patent Application No. 10-2008-0006157, filed on Jan. 21, 2008, the disclosure of which is incorporated herein in its entirety by reference.

BACKGROUND OF THE INVENTION

1. Field of the Invention

The present invention relates to a wireless communication system, and more particularly, to a method and apparatus for detecting a transmission symbol using a lattice-reduction matrix in a Multiple Input Multiple Output (MIMO) system.

2. Description of the Related Art

In a wireless transmission/reception system, a symbol transmitted from a transmitter may be distorted by influences of multipath, signal attenuation, noise, etc., and a receiver will receive a distorted symbol if such signal distortion occurs. In this case, the receiver should restore the original transmission symbol transmitted from the transmitter, using the received signal and channel characteristic information.

Recently, research has been conducted on a Multiple Input Multiple Output (MIMO) system which increases a data transfer rate by utilizing a plurality of antennas. The MIMO system can maintain a high data transfer rate because it transmits data simultaneously using a plurality of antennas, but requires a large amount of calculations to exactly detect transmission symbols, which complicates the structure of a receiver and makes the implementation of the receiver difficult.

Representative linear detection methods that are used in the MIMO system are based on zero-forcing (ZF), minimum mean square error (MMSE), or successive interference cancellation (SIC). Also, utilizing a BLAST-ordered decision feedback (BODF) detector is the simplest detection method. However, in the case of an ill-conditioned channel matrix, the linear detection methods have not shown excellent performance compared to utilizing a maximum likelihood (ML) detector. Accordingly, in order to solve the problem, a variety of detectors have been developed.

A lattice-aided detector has performance higher than those of SIC detectors or linear detectors with low complexity, and calculates a lattice-reduction matrix in order to transform a system matrix to an equivalent one with a better conditioned channel matrix. The lattice-reduction matrix can be calculated by an LLL (Lenstra, Lenstra, Lovaz) algorithm, etc. Meanwhile, a double-sorted low complexity lattice-reduced decision-feedback (DOLLAR) detector can be utilized as a lattice-aided detector. However, since the conventional detection method using the lattice-reduction matrix does not provide a soft output, it is difficult to obtain coding gain by soft decision channel decoding.

SUMMARY OF THE INVENTION

The present invention provides a method and apparatus for detecting a transmission symbol using a lattice-reduction matrix, which provides a soft output by exchanging positions of the components of the rows or columns of a noise matrix under a predetermined condition before restoring an original transmission signal, when symbol detection is performed using the lattice-reduction matrix in a Multiple Input Multiple Output (MIMO) system.

According to an aspect of the present invention, there is provided a method of detecting a transmission symbol using a lattice-reduction matrix in a system including a plurality of antennas, the method including: restoring an original transmission symbol from a reception signal received through the plurality of antennas; and obtaining at least one noise component included in the reception signal from a constellation changed due to applying the lattice-reduction matrix, changing a position of the at least one noise component under a predetermined condition which depends on a state of the restored transmission symbol, and processing the at least one noise component whose position is changed, together with the restored transmission symbol, thereby providing a soft output.

According to another aspect of the present invention, there is provided a method of detecting a transmission symbol using a lattice-reduction matrix, in a system having a plurality of antennas, the method including: detecting a symbol matrix resulting from multiplying a transmission signal matrix transmitted from the plurality of antennas by an inverse function of the lattice-reduction matrix, from a reception signal matrix consisting of a plurality of reception signals received through a plurality of input/output channels from the plurality of antennas, and calculating a noise matrix by subtracting the detected symbol matrix from the reception signal matrix; restoring the detected symbol matrix to an original transmission symbol matrix which existed before multiplying the transmission symbol matrix by the inverse function of the lattice-reduction matrix; when positions of component values of the restored transmission symbol matrix are changed with respect to positions of component values of the detected symbol matrix, exchanging positions of component values of a noise matrix consisting of noise components calculated for the plurality of antennas, in correspondence to the positions of the component values of the restored transmission symbol matrix; and adding the restored transmission symbol matrix to the noise matrix in which the positions of the component values are exchanged.

According to another aspect of the present invention, there is provided an apparatus for detecting a transmission symbol using a lattice-reduction matrix in a system including a plurality of antennas, the apparatus including: a detector detecting a symbol matrix resulting from multiplying a transmission signal matrix transmitted from the plurality of antennas by an inverse function of the lattice-reduction matrix, from a reception signal matrix consisting of a plurality of reception signals received through a plurality of input/output channels from the plurality of antennas, and calculating a noise matrix by subtracting the detected symbol matrix from the reception signal matrix; a restoring unit restoring the detected symbol matrix to an original transmission symbol matrix; a post processor exchanging positions of component values of a noise matrix consisting of noise components calculated for the plurality of antennas, in correspondence to positions of component values of the restored original transmission symbol matrix, when the positions of the component values of the restored transmission symbol matrix are changed with respect to positions of component values of the detected symbol matrix; and an adder adding the restored symbol matrix to the noise matrix in which the positions of the component values are exchanged.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

Figure 1:
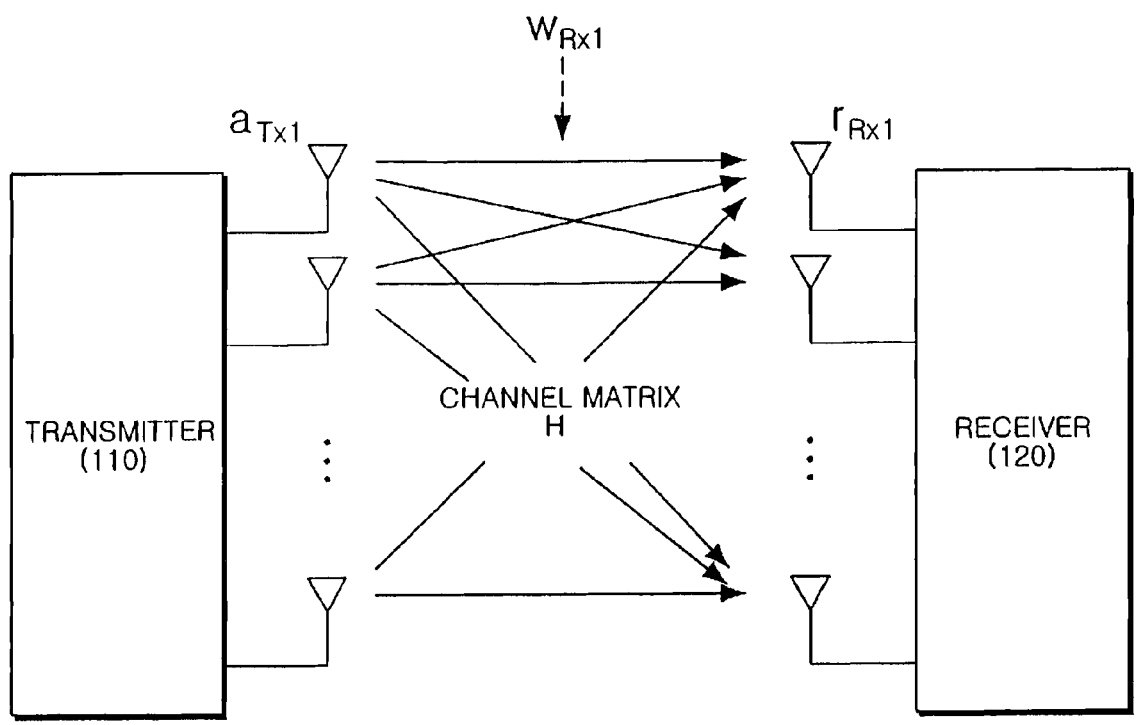
FIG. 1 is a view for explaining a Multiple Input Multiple Output (MIMO) system using a plurality of antennas.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a view for explaining a Multiple Input Multiple Output (MIMO) system using a plurality of antennas $a_{Tx1}$ and $r_{Rx1}$.

The MIMO system includes the plurality of antennas $a_{Tx1}$ and $r_{Rx1}$ so that a transmitter 110 and a receiver 120 can simultaneously transmit and receive a plurality of signals through the plurality of antennas $a_{Tx1}$ and $r_{Rx1}$, respectively.

For example, a conventional wireless LAN utilizes a single antenna which is assigned to each access point AP to connect a wired network to a wireless network, even when a plurality of antennas can be installed in the conventional wireless LAN. However, a MIMO system can exchange data at a high speed by simultaneously operating a plurality of antennas.

That is, since the transmitter 110 and receiver 120 each includes a plurality of antennas $a_{Tx1}$ and $r_{Rx1}$ through which data is transmitted and received at the same time, data communications can be performed at a very high speed. For example, in the MIMO system illustrated in FIG. 1, a signal received through the receiver 120 can be expressed by equation 1:

$$r_{Rx1} = H a_{Tx1} + w_{Rx1}, \quad (1)$$

where r represents a signal vector received through the receiver 120, a represents a transmission symbol vector transmitted from the transmitter 110, w represents a noise (Additive White Gaussian Noise, AWGN) vector, H represents a channel matrix for reflecting channel characteristics of the MIMO system, T represents the number of transmission antennas, and R represents the number of reception antennas.

Equation 1 can be rewritten as Equation 2 by obtaining a lattice-reduction matrix T. Equation 2 can be used to model a general detector using the lattice-reduction matrix T.

$$r = Ha + w = HT(T^{-1}a) + w = H_L(T^{-1}a) + w = H_L x + w \quad (2)$$

Figure 2:
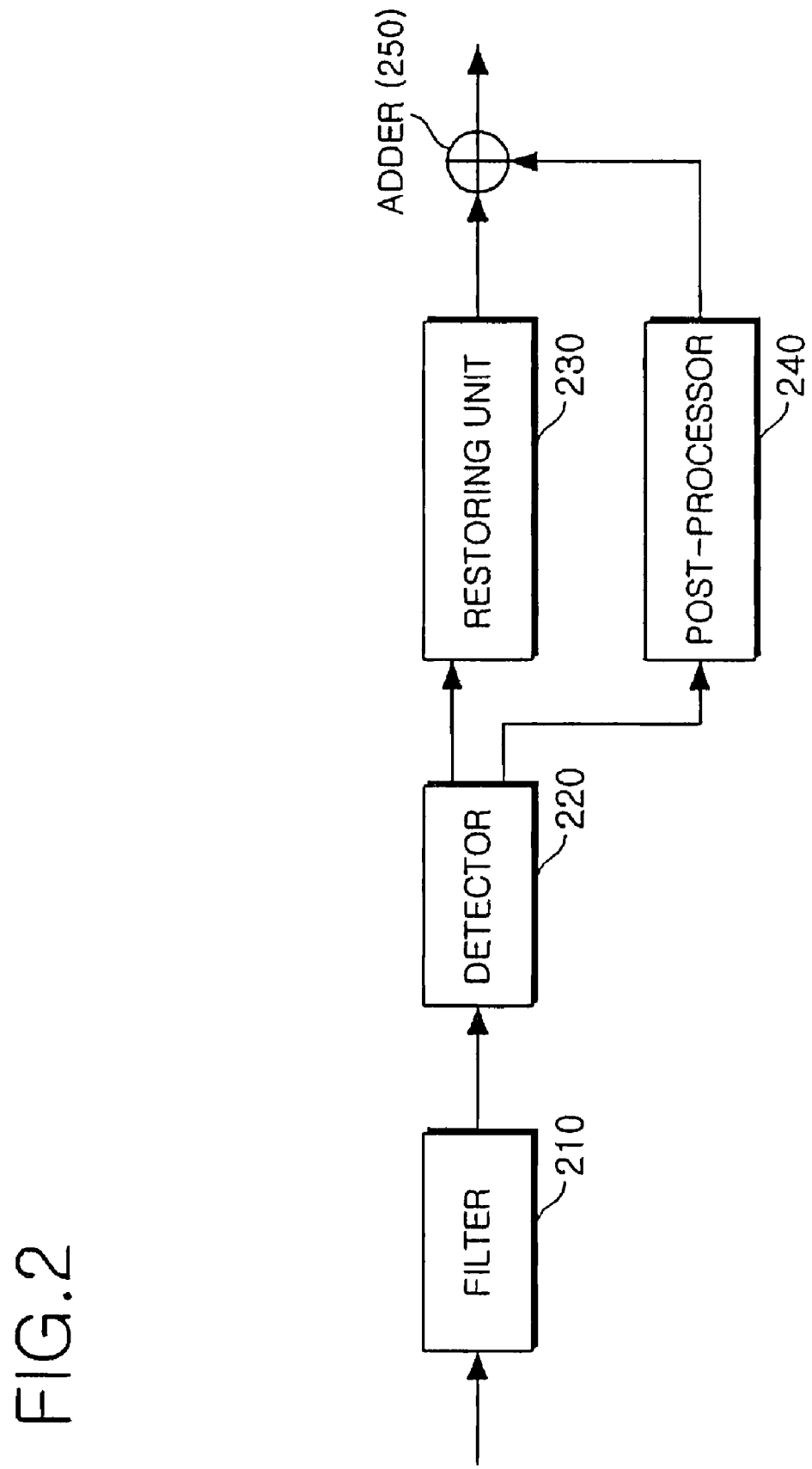
FIG. 2 is a block diagram of a transmission symbol detection apparatus with a soft output using a lattice-reduction matrix, according to an embodiment of the present invention.

FIG. 2 is a block diagram of a transmission symbol detection apparatus with a soft output using a lattice-reduction matrix, according to an embodiment of the present invention.

Referring to FIG. 2, the transmission symbol detection apparatus includes a filter 210, a detector 220, a restoring unit 230, a post-processor 240, and an adder 250.

The filter 210 filters a signal received through a plurality of antennas, using a filter matrix calculated on the basis of an effective channel matrix $H_L$ (=HT) obtained by multiplying a channel matrix H by a lattice-reduction matrix T. The detector 220 can use various detection methods, such as linear detection, SIC detection, noise-predictive feedback detection, etc. In more detail, the detector 220 detects a symbol matrix obtained by multiplying a transmission symbol matrix transmitted through the plurality of antennas by an inverse function of the lattice-reduction matrix T, from a reception signal matrix consisting of received filtered signals, and calculates a noise matrix by subtracting the symbol matrix from the reception signal matrix. The noise matrix can be calculated by the detector 220 or by an extra noise calculator.

Meanwhile, an embodiment of a double-sorted low complexity lattice-reduced decision-feedback (DOLLAR) detection method, which is a symbol detection method using a lattice-reduction matrix, will be described later with reference to FIGS. 3 and 5.

The restoring unit 230 multiplies the transmission symbol matrix which consists of transmission symbols received through a plurality of antennas, by the lattice-reduction matrix T, thereby restoring an original transmission symbol matrix. Here, since there may be a case where symbol values obtained by multiplying the transmission symbols by the lattice-reduction matrix T do not belong to a group of original transmission symbols, due to detection errors, there is needed a process of constructing transmission symbol constellations and selecting the nearest symbols from among the transmission symbol constellations, through slicing after multiplying the transmission symbols by the lattice-reduction matrix T. For example, in the DOLLAR detection method which is a detection method using the lattice-reduction matrix T, the lattice-reduction matrix T has a format of $\Pi_1 M_1 \Pi_2$, wherein $\Pi_1$ and $\Pi_2$ are matrices obtained by exchanging components of rows or columns of an identity matrix with each other, and M is a matrix whose diagonal components are all "1" and whose other components are complex numbers whose real and imaginary parts are all integers.

A unimodular matrix means a matrix whose determinant value is ±1 or ±j, and a lower triangle matrix means a matrix in which effective values exist only below the main diagonal.

Accordingly, the matrix M is a matrix whose determinant value is ±1 or ±j and in which effective values exists only below the main diagonal.

The post-processor 240 exchanges the positions of the components of the noise matrix detected by the detector 220, under a predetermined condition. That is, when the positions of the transmission symbols of the detector 220 have been exchanged by the restoring unit 230, the post-processor 240 exchanges the positions of the components of the noise matrix with each other in correspondence to the exchange in the positions of the transmission symbols. In other words, when the positions of the components of the transmission symbol matrix consisting of transmission symbols received through the antennas are changed from the positions of the components of the symbol matrix consisting of symbols detected by the detector 220, the post-processor 240 exchanges with each other the positions of the components of the noise matrix consisting of noise components calculated for the respective antennas, in correspondence to the change in the positions of the components of the detected symbol matrix. A determination on whether the positions of the symbol values have been exchanged depends on $\Pi_1\Pi_2$ in the case of the DOLLAR detection method.

Mapping results obtained by position exchange will be described with reference to FIG. 4, later.

The adder 250 adds the symbol matrix restored by the restoring unit 230 to the noise matrix obtained by the post-processor 240, thereby creating a soft output. That is, noise on constellations changed by inserting a lattice-reduction matrix is used to create a soft output. As such, a soft output required for soft decision channel decoding can be created by processing noise through post-processing without multiplying the noise by the lattice-reduction matrix.

Figure 3:
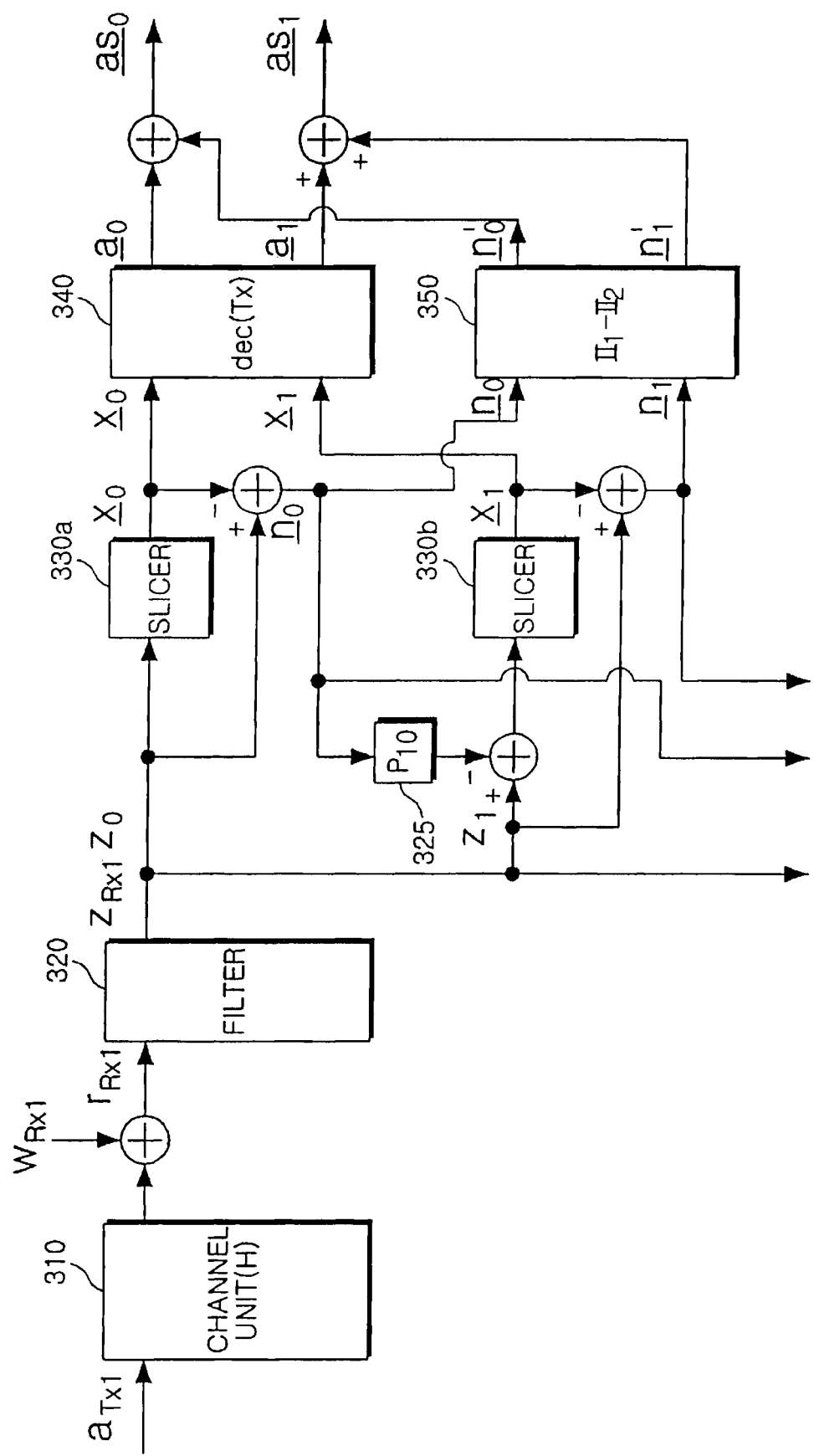
FIG. 3 is a detailed block diagram of a double-sorted low complexity lattice-reduced decision-feedback (DOLLAR)-based transmission symbol detection apparatus using a lattice-reduction matrix, according to an embodiment of the present invention.

FIG. 3 is a detailed block diagram of a DOLLAR-based transmission symbol detection apparatus using a lattice-reduction matrix, according to an embodiment of the present invention.

Referring to FIG. 3, a channel unit 310 applies a channel matrix H to an input signal. That is, the channel unit 310 applies a channel matrix H for reflecting channel characteristics of a MIMO system to an input signal, and outputs the resultant signal to a filter 320. The filter 320 filters the received signal using a filter matrix calculated on the basis of an effective channel matrix $H_L$ (=HT) obtained by multiplying the channel matrix H by a lattice-reduction matrix T.

Meanwhile, the detector 220 illustrated in FIG. 2 includes slicers 330a and 330b distorted due to applying the lattice-reduction matrix and a noise weight applying unit 325. The slicers 330a and 330b detect symbols in constellations, which are nearest to filtered signals received through a plurality of antennas. The constellations are also different from the constellations of original transmission signals, due to applying the lattice-reduction matrix T. A restoring unit 340 and a post-processor 350 have the same structures as those of the restoring unit 230 and the post-processor 240 illustrated in FIG. 2. That is, a=dec(Tx) and n'=$\Pi_1\Pi_2$n, wherein dec means "decision". And, decision means slicing of multiplying a symbol matrix consisting of the detected symbols by the lattice-reduction matrix T to construct transmission symbol constellations, and then selecting symbols which are nearest to the original transmission signals from among the transmission symbol constellations.

As a result, the output of the DOLLAR-based transmission symbol detection apparatus with the soft output illustrated in FIG. 3 can be calculated by equation 3.

$$as_0 = a_0 + n'_0$$
$$as_1 = a_1 + n'_1 \tag{3}$$

Figure 4:
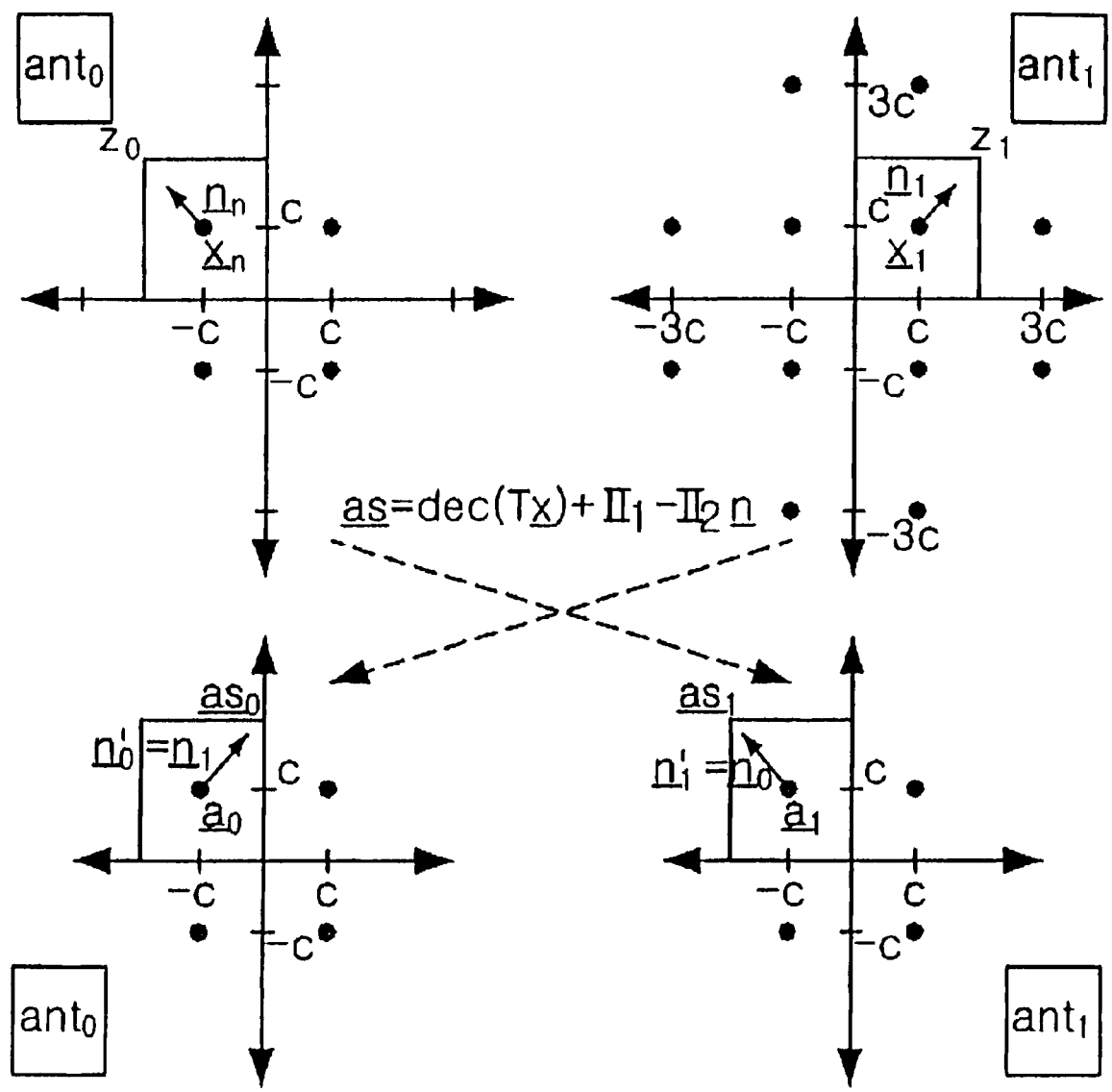
FIG. 4 is a graph for explaining a process of producing transmission symbols with a soft output, which are obtained by the DOLLAR-based transmission symbol detection apparatus illustrated in FIG. 3.

FIG. 4 is a graph for explaining a process of producing transmission symbols with a soft output, which are obtained by the DOLLAR-based transmission symbol detection apparatus illustrated in FIG. 3.

Referring to FIG. 4, the output as of the transmission symbol output apparatus can be calculated according to equation 4.

$$as = \text{dec}(Tx) + \Pi_1\Pi_2\bar{n} \tag{4}$$

For example, if $\Pi_1, \Pi_2$, M, T, and $T^{-1}$ are set as below, the symbol results illustrated in FIG. 4 can be obtained.

$$\Pi_1 = \begin{bmatrix} 0 & 1 \\ 1 & 0 \end{bmatrix} \tag{5}$$

$$\Pi_2 = I$$

$$M = \begin{bmatrix} 1 & 0 \\ 1+j & 1 \end{bmatrix}$$

$$T = \begin{bmatrix} 1+j & 1 \\ 1 & 0 \end{bmatrix}$$

$$T^{-1} = \begin{bmatrix} 0 & 1 \\ 1 & -1-j \end{bmatrix}$$

Since the positions of transmission symbols "a" are exchanged by $\Pi_1\Pi_2$, the positions of noise components are also exchanged and then added to the symbols "a".

Figure 5:
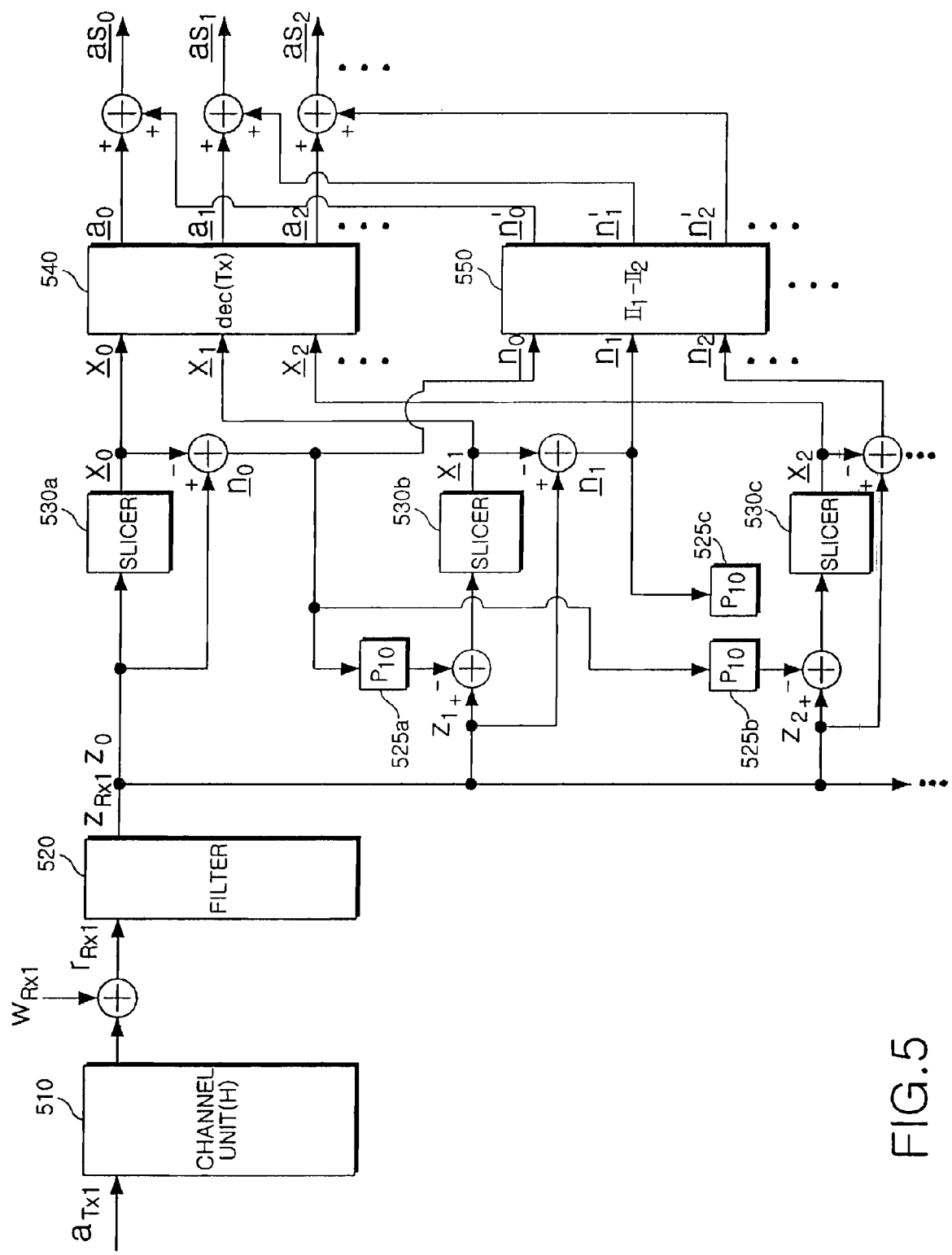
FIG. 5 is a detailed block diagram of a transmission symbol detection apparatus with a soft output, according to another embodiment of the present invention.

FIG. 5 is a detailed block diagram of a transmission symbol detection apparatus with a soft output, according to another embodiment of the present invention.

In more detail, the transmission symbol detection apparatus illustrated in FIG. 5 has the same configuration as the transmission symbol detection apparatus illustrated in FIG. 3, except that the number of input/output signals is different from that illustrated in FIG. 3.

A channel unit 510 and a filter 520 illustrated in FIG. 5 correspond respectively to the channel unit 310 and the filter 320 illustrated in FIG. 3. As the number of input/output signals increases, the number of signals input/output to/from the restoring unit 540 and the post processor 550 also increases. Also, the number of slicers 530a, 530b, and 530c and the number of taps 525a, 525b, and 525c increase in correspondence to the increase in the number of the input/output signals.

Figure 6:
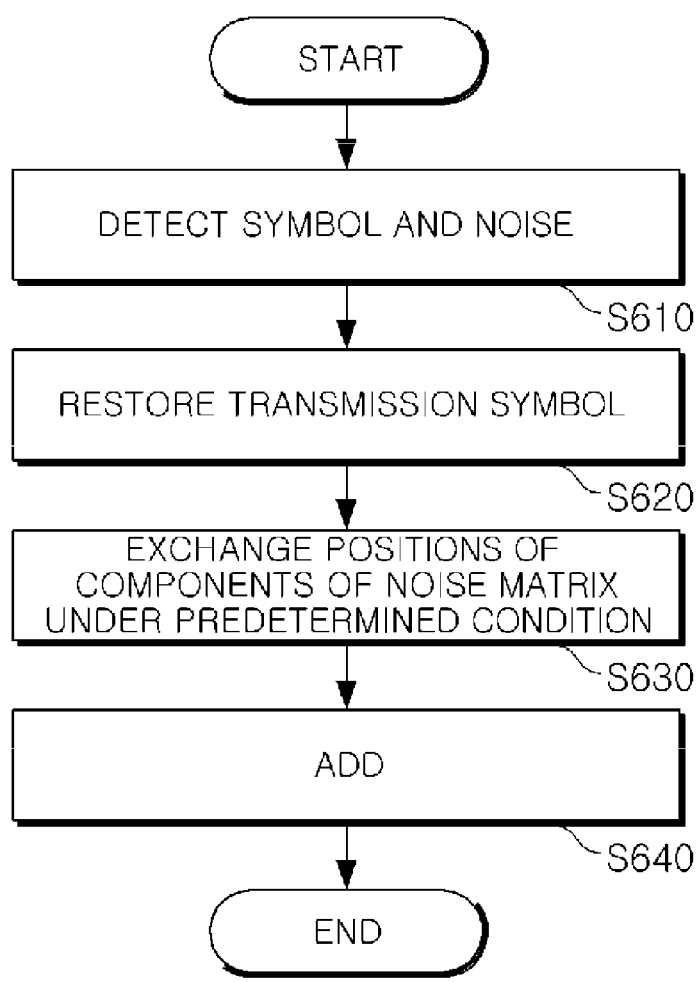
FIG. 6 is a flowchart of a transmission symbol detection method with a soft output, according to an embodiment of the present invention.

FIG. 6 is a flowchart of a transmission symbol detection method with a soft output, according to an embodiment of the present invention.

A symbol matrix is detected from a reception signal matrix consisting of reception signals received through a plurality of input/output channels from a plurality of antennas, by multiplying a transmission signal matrix transmitted from the plurality of antennas by an inverse function of a lattice-reduction matrix T, and a noise matrix is calculated by subtracting the detected symbol matrix from the reception signal matrix (operation S610). The noise matrix can be calculated by a predetermined noise calculation process. Also, the reception signals can be detected by various detection methods, such as linear detection, SIC detection, noise-predictive feedback detection, etc.

Then, the detected symbol matrix is restored to the original transmission symbol matrix which existed before it was multiplied by the inverse function of the lattice-reduction matrix T (operation S620). The restoration of the transmission symbols is performed through slicing of multiplying the symbol matrix obtained in operation S610 by the lattice-reduction matrix to construct transmission symbol constellations, and then selecting symbols which are nearest to the original transmission symbols from among the transmission symbol constellations.

For example, in the DOLLAR detection method, the lattice-reduction matrix T is defined by $\Pi_1 M \Pi_2$, wherein $\Pi_1$ and $\Pi_2$ are matrices obtained by exchanging the components of rows or columns of an identity matrix with each other, and M is a matrix (referred to as a special unimodular lower triangular matrix) whose diagonal components are all "1" and whose other components are complex numbers whose real and imaginary parts are all integers.

Meanwhile, if the positions of the component values of the restored transmission symbol matrix are changed from the positions of the component values of the symbol matrix obtained in operation S610, the positions of the noise components of a noise matrix calculated for the antennas are also exchanged in correspondence to the positions of the symbol values (operation S630). That is, when the positions of antenna symbols are exchanged, the positions of noise components are also exchanged in correspondence to the positions of the antenna symbols. For example, in the case of the DOLLAR detection method, the position exchange depends on $\Pi_1 \Pi_2$.

The obtained result, that is, the restored symbol matrix is added to the noise matrix in which the positions of noise components are exchanged under the predetermined condition, and the result of the adding is output (operation S640). That is, noise in constellations changed by applying the lattice-reduction matrix T is used to create a soft output.

Meanwhile, before operation 610, filtering can be performed. The filtering operation is performed to filter a received signal by a filter matrix calculated on the basis of an effective channel matrix $H_L$ (=HL) obtained by multiplying the channel matrix H by the lattice-reduction matrix T.

Therefore, since a soft output can be created by using the symbol detection method according to an embodiment of the present invention, a performance gain in channel decoding can be obtained.

Meanwhile, the transmission symbol detection method as described above can be implemented as a computer program. Codes and code segments constituting the computer program can be easily deduced by computer programmers in the art. The program is stored in computer readable media and is executed by a computer, thereby performing the transmission symbol detection method. The computer readable media includes a magnetic recording medium, an optical recording medium, and a carrier wave medium.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of detecting a transmission symbol using a lattice-reduction matrix in a system including a plurality of antennas, the method comprising:
    restoring an original transmission symbol from a reception signal received through the plurality of antennas; and
    obtaining at least one noise component included in the reception signal from a constellation changed due to applying the lattice-reduction matrix, changing a position of the at least one noise component under a predetermined condition which depends on a state of the restored transmission symbol, and processing the at least one noise component whose position is changed, together with the restored transmission symbol, thereby providing a soft output,
    wherein the restoring of the symbol matrix to the original transmission symbol is performed through slicing of multiplying the detected symbol matrix by the lattice-reduction matrix to construct a plurality of constellations.

2. The method of claim 1, wherein said restoring comprises multiplying a transmission symbol matrix comprising a transmission symbol received through the plurality of antennas by the lattice reduction matrix.

3. The method of claim 1, wherein the lattice-reduction matrix is defined by $\Pi 1 M 1 \Pi 2$, wherein $\Pi 1$ and $\Pi 2$ are matrices obtained by exchanging components of rows or columns of an identity matrix with each other, and M is a matrix (a special unimodular lower triangular matrix) whose diagonal components are all "1" and whose other components are complex numbers whose real and imaginary parts are all integers.

4. The method of claim 1, wherein the restoring of the symbol matrix to the original transmission symbol further comprises selecting symbols which are nearest to original transmission signals from among the plurality of constellations.

5. The method of claim 1, wherein the lattice-reduction matrix is defined by $\Pi 1 M 1 \Pi 2$, wherein $\Pi 1$ and $\Pi 2$ comprise matrices obtained by exchanging components of rows or columns of an identity matrix with each other, and M comprises a matrix (a special unimodular lower triangular matrix) whose diagonal components comprise "1", and whose other components comprise complex numbers whose real and imaginary parts comprise integers.

6. The method of claim 1, further comprising:
    detecting a symbol matrix,
    wherein the at least one noise component is determined by subtracting the detected symbol matrix from the reception signal.

7. The method of claim 1, wherein said processing comprises:
    exchanging positions of component values of the at least one noise component, in correspondence to the positions of the component values of the restored transmission symbol; and
    adding the restore transmission symbol to the at least one noise component in which the positions of the component values are exchanged.

8. A method of detecting a transmission symbol using a lattice-reduction matrix, in a system having a plurality of antennas, the method comprising:
    detecting a symbol matrix resulting from multiplying a transmission signal matrix transmitted from the plurality of antennas by an inverse function of the lattice-reduction matrix, from a reception signal matrix comprising of a plurality of reception signals received through a plurality of input/output channels from the plurality of antennas, and calculating a noise matrix by subtracting the detected symbol matrix from the reception signal matrix;
    restoring the detected symbol matrix to an original transmission symbol matrix which existed before multiplying the transmission symbol matrix by the inverse function of the lattice-reduction matrix;
    when positions of component values of the restored transmission symbol matrix are changed with respect to positions of component values of the detected symbol matrix, exchanging positions of component values of a noise matrix comprising of noise components calculated for the plurality of antennas, in correspondence to the positions of the component values of the restored transmission symbol matrix; and adding the restored transmission symbol matrix to the noise matrix in which the positions of the component values are exchanged.

9. The method of claim 8, further comprising filtering the reception signals received through the plurality of input/output channels, before the detecting of the symbol matrix and the calculating of the noise matrix.

10. The method of claim 9, wherein a filter matrix used for the filtering is calculated on the basis of an effective channel matrix obtained by multiplying a channel matrix representing characteristics of the plurality of input/output channels by the lattice-reduction matrix used for the restoring.

11. The method of claim 8, wherein the restoring of the symbol matrix to the original transmission symbol is performed through slicing of multiplying the detected symbol matrix by the lattice-reduction matrix to construct a plurality of constellations and then selecting symbols which are nearest to original transmission signals from among the plurality of constellations.

12. The method of claim 11, wherein the lattice-reduction matrix is defined by $\Pi_1 M_1 \Pi_2$, wherein $\Pi_1$ and $\Pi_2$ are matrices obtained by exchanging components of rows or columns of an identity matrix with each other, and M is a matrix (a special unimodular lower triangular matrix) whose diagonal components are all "1" and whose other components are complex numbers whose real and imaginary parts are all integers.

13. The method of claim 8, wherein the exchanging of the positions of the component values of the noise matrix is performed using matrixes $\Pi_1$ and $\Pi_2$ obtained by exchanging components of columns or rows with each other, when a signal that is to be subjected to position exchange is received in the restoring of the detected symbol matrix to the original transmission symbol matrix.

14. An apparatus for detecting a transmission symbol using a lattice-reduction matrix in a system including a plurality of antennas, the apparatus comprising:

a detector detecting a symbol matrix resulting from multiplying a transmission signal matrix transmitted from the plurality of antennas by an inverse function of the lattice-reduction matrix, from a reception signal matrix comprising of a plurality of reception signals received through a plurality of input/output channels from the plurality of antennas, and calculating a noise matrix by subtracting the detected symbol matrix from the reception signal matrix;

a restoring unit restoring the detected symbol matrix to an original transmission symbol matrix;

a post processor exchanging positions of component values of a noise matrix comprising of noise components calculated for the plurality of antennas, in correspondence to positions of component values of the restored original transmission symbol matrix, when the positions of the component values of the restored transmission symbol matrix are changed with respect to positions of component values of the detected symbol matrix; and an adder adding the restored symbol matrix to the noise matrix in which the positions of the component values are exchanged.

15. The apparatus of claim 14, further comprising a filter filtering the plurality of reception signals received through the plurality of input/output channels.

16. The apparatus of claim 14, wherein the lattice-reduction matrix is defined by $\Pi_1 M_1 \Pi_2$, wherein $\Pi_1$ and $\Pi_2$ are matrices obtained by exchanging components of rows or columns of an identity matrix with each other, and M is a matrix (a special unimodular lower triangular matrix) whose diagonal components are all "1" and whose other components are complex numbers whose real and imaginary parts are all integers.

17. The apparatus of claim 14, wherein the post processor exchanges the positions of the component values of the noise matrix using matrices $\Pi_1$ and $\Pi_2$ which are obtained by exchanging components of rows or columns of an identity matrix with each other, when the restoring unit receives a signal that is to be subjected to position exchange.

* * * * *